US006677396B2

(12) United States Patent
Tsui et al.

(10) Patent No.: US 6,677,396 B2
(45) Date of Patent: Jan. 13, 2004

(54) AMORPHOUS POLYPROPYLENE BASED ADHESIVE

(75) Inventors: Sum-Wing Tsui, Leeds (GB); Anthony Francis Johnson, Leeds (GB)

(73) Assignee: Gluco Limited, Leeds (GB)

( * ) Notice: Subject to any disclaimer, the term of this patent is extended or adjusted under 35 U.S.C. 154(b) by 0 days.

(21) Appl. No.: 10/221,415

(22) PCT Filed: Oct. 30, 2001

(86) PCT No.: PCT/GB01/04818

§ 371 (c)(1),
(2), (4) Date: Dec. 23, 2002

(87) PCT Pub. No.: WO02/36704

PCT Pub. Date: May 10, 2002

(65) Prior Publication Data

US 2003/0105211 A1 Jun. 5, 2003

(30) Foreign Application Priority Data

Oct. 30, 2000 (GB) ................................................ 0026507

(51) Int. Cl.$^7$ ................................................. C08K 5/07
(52) U.S. Cl. ........................ 524/476; 524/478; 524/482; 524/484; 524/487; 524/502; 524/507; 524/514
(58) Field of Search ................................ 524/487, 476, 524/478, 482, 484, 502, 507, 514

(56) References Cited

U.S. PATENT DOCUMENTS

| 3,717,601 A | 2/1973 | Jurrens |
| 3,929,550 A | 12/1975 | Gaylord |
| 4,472,555 A | 9/1984 | Schmukler et al. |
| 4,554,304 A | 11/1985 | Hansen et al. |
| 4,654,389 A | 3/1987 | Graham et al. |
| 4,664,984 A | 5/1987 | Klosiewicz |
| 4,726,869 A | 2/1988 | Matsui et al. |
| 4,727,120 A | 2/1988 | Nogues |
| 4,921,921 A | 5/1990 | Ritter |

FOREIGN PATENT DOCUMENTS

| EP | 0 317 359 | | 11/1988 |
| EP | 0 411 191 A1 | | 8/1989 |
| EP | 0 370 735 | | 11/1989 |
| EP | 0 370 736 | | 11/1989 |
| EP | 0 398 734 | | 5/1990 |
| EP | 0 480 069 A1 | | 4/1991 |
| EP | 0 501 762 A1 | | 2/1992 |
| EP | 1125980 A1 | * | 8/2001 |
| EP | 1 125 980 A1 | | 8/2001 |
| WO | WO 94/04625 | | 3/1994 |
| WO | WO 95/09212 | | 4/1995 |
| WO | WO 96/33248 | | 10/1996 |
| WO | WO 98/28354 | | 7/1998 |

* cited by examiner

Primary Examiner—David W. Wu
Assistant Examiner—William Cheung
(74) Attorney, Agent, or Firm—Beyer Weaver & Thomas LLP

(57) ABSTRACT

An adhesive composition comprises an amorphous polyalphaolefin, 50–90 wt %; a tackifier 10–40 wt %; a functionalised polypropylene trace-20 wt %; and optional further ingredients selected from stablisers, fillers and waxes; wherein the proportions of the amorphous polyalphaolefin, tackifier and functionalised polypropylene are selected to total 100%. A method of forming polypropylene packaging using the adhesive is also provided.

10 Claims, No Drawings

AMORPHOUS POLYPROPYLENE BASED ADHESIVE

This application relates to an adhesive for joining surfaces formed of various materials including polymers, paper, metals and ceramics, particularly but not exclusively, polypropylene. The invention finds particular but not exclusive application in high-speed manufacture of packaging.

Bonding of polypropylene sheets to form boxes or containers using conventional packaging equipment has been limited by the high speeds, e.g. 180 m/min at which the sheet materials need to be handled for commercial viability. Conventional polypropylene adhesives cannot be applied at such speeds whilst retaining good bonding properties.

According to a first aspect of the present invention an adhesive composition comprises:

| 1) | an amorphous polyalphaolefin | 50–90% |
| 2) | a tackifier | 10–40% |
| 3) | a functionalised polypropylene | trace–20% |

4) and optional further ingredients selected from stabilisers, fillers and waxes;
wherein the proportions of 1, 2 and 3 are selected to total 100%.

According to a second aspect of the present invention, a method of forming a polypropylene article comprises the steps of:

applying a quantity of an adhesive in accordance with the first aspect of this invention to a first surface of a workpiece, contacting a second surface of the workpiece to the adhesive; and allowing the adhesive to set to form said article, wherein tie first and second surfaces are secured together by the adhesive.

The article is preferably polypropylene packaging and the workpiece is a blank for manufacture of the packaging. The packaging may be completely composed of polypropylene or may comprise polypropylene in addition to one or more different materials.

An adhesive in accordance with the present invention may confer several advantages. The adhesive has good adhesion properties and can be applied at high speed without tacking or stringing to polypropylene or other sheet materials using conventional packaging equipment which may process up to 15,000 articles per hour or more providing the folding and dispense technology has the capacity to perform at higher rates.

Compositions in accordance with the present invention not only can be used for self-bonding of polypropylene but may be used for a wide range of different substrates including other polymers paper, ceramics and metals. The compositions can be readily formulated to accommodate rheological and open-time demands of a wide range of machinery used for manufacture of different types of packaging, including composite products when polypropylene is present together with another polymer, paper, ceramic or metal.

When used to bond polypropylene the composition has the advantage that the adhesive, also being composed predominantly of polypropylene does not introduce additional polymers into the product, facilitating recycling of the bonded composite.

Compositions in accordance with the invention are transparent and preferably non-coloured, allowing use on transparent sheet materials. Preferred polypropylenes used in accordance with this invention have good intrinsic thermal and oxidative stability or can be made more stable with small amounts of conventional additives.

Percentages and proportions used in this specification are by weight unless indicated otherwise.

Preferably about 70% of the amorphous polyalphaolefin is used. Preferred polyalphaolefins include ethene/propene/1-butene copolymers. Atactic polypropylene is preferred. A particularly preferred polypropylene is Vestoplast 704 (manufactured by Dagussa-Hüls AG).

Preferred amorphous polyalphaolefins have a melt viscosity at 190° C. of 2,700–50,000, preferably 3,000–4,000 mPa.s (cp).

Various tackifiers may be employed, including hydrocarbon resins, rosin esters and other resins of natural origin and hydrogenated resins. Preferred tackifiers have low viscosity, clarity and thermal stability. $C_5$ hydrocarbon oligomer resins with Mw 500 to 1,500, preferably 700 may be employed. The preferred resins include Regalite resins manufactured by Hercules, for example, Regalite R1090.

The functionalised polypropylene may be produced directly by reactive modification by using radical chemistry where the functional group can be isocyanate, anhydride, amine, alcohol or acid. The functionalised polypropylene may also be made by copolymerisation of propylene with a suitable diolefinic monomer and then subsequent modification of the pendant unsaturation. Maleic anhydride grafted polypropylenes may be employed. Alternatively 2,2'-dimethyl-1,3-isopropenyl benzyl isocyanate (also known as dimethyl meta-isopropenyl benzyl isocyanate (TMI)) modified polypropylenes as disclosed in WO96/34024, WO96/34031 and WO98/13398 may be employed.

The functionalised polypropylenes may be used to give cohesive strength and adjust the rheological behaviour to increase the adhesion properties. Use of functionalised polypropylenes has the advantage that the adhesive may be recycled together with polypropylene packaging to which it has been applied.

Further ingredients may include UV stabilisers and fillers. Hydrocarbon waxes may be used to modify the viscosity if necessary. However, use of hydrocarbon waxes is not preferred.

The invention is further described by means of example but not in any limitative sense.

EXAMPLE 1

An adhesive was prepared both by a conventional batch method and by continuous processing technique. In the batch process, a mixture of amorphous polyalphaolefin (Vestoplast 704) (20 kg), tackifier (Regalite R1090) (6.3 kg) and maleic anhydride functionalised polypropylene (Exxelor P01015) (2.3 kg) was stirred inside a stainless steel vessel at 170° C. until all the ingredients were melted. The homogeneous melt mixture was then dispensed into suitable containers for cooling and analysis.

EXAMPLE 2

An APV 2030, 30 mm diameter screw, 40:1 L/D, co-rotating twin-screw extruder was used in a continuous method of manufacturing of the adhesive. A polyalphaolefin/tackifier/functionalised polypropylene mixture, similar to that as described in Example 1, was fed continuously into the hopper of the extruder. The feed rate was approximately 7 $kgh^{-1}$ and the extrusion temperature was approximately 160° C. The extrudate was then collected into suitable containers for cooling and further analysis.

EXAMPLE 3

The thermal behaviour of the adhesive as described in Example 1 was examined by differential scanning calorimetry, thermogravimetric analysis and melt rheometry. The onset of melting of the adhesive was found at approximately 60° C. There was a loss of 5–6% in weight after the adhesive sample had been exposed in air at 180° C. for 6 hours. A typical value for the melt viscosity of the adhesive at 180° C. was 3000 cps. The open time of the adhesive was also measured with reference to ASTM D 4497–94. It was found to be 2 minutes. It has been shown that an adhesive with such thermal characteristics is suitable for the application in high-speed packaging (see Examples 5–8).

EXAMPLE 4

The bond strength of the adhesive as described in Example 1 was examined by lap-shear test of single overlap joints (with reference to BS 5350: Part C5: 1990, ASTM D 1002–94 and D3164–97) and T-peel test (with reference to BS 5350: Part C12: 1994 and ASTM D 1876–95). A polypropylene sheet with a thickness of 0.5 mm was used to prepare all the test samples in order to demonstrate the bonding ability of this adhesive with untreated polyolefins.

The bonding temperature and contact time were 120° C. and 1 minute respectively. Results are shown in Tables 1 and 2.

TABLE 1

Variation of shear strength with temperature.

| Temperature (° C.) | 0 | 18 | 35 | 45 |
|---|---|---|---|---|
| Maximum stress (MPa) | >1.30 | 0.80 | 0.52 | 0.39 |

TABLE 2

Variation of peel strength with temperature.

| Temperature (° C.) | −20 | 0 | 18 | 35 | 45 |
|---|---|---|---|---|---|
| Peel strength (N/mm) | 0.07 | 1.02 | 1.52 | 0.39 | 0.17 |

EXAMPLE 5

Polypropylene Single Ply Substrates for Packaging

The adhesive as described in Example 1 has been successfully used for the automated in-line rapid bonding of:

a) Side seam constructions.
  b) Crash-lock base constructions.
  c) Skillet-end enclosures.
  d) Tamper evident top closures.

a)/b)—Standard folder/gluer machines as manufactured by Bobst, Vega, Jagenburg etc. for the manufacture of cardboard cartons were used for all trials without modification. Standard hot melt dispense equipment and pattern controllers as supplied by Nordson, Valco Cincinnati, HHS etc. were used on all trials. The folder/gluer machines were set up to provide folding sections that would allow suitable dispense of our adhesive before the final fold to make the bond. Typical manufacturing speeds obtained were comparable with those attained on cardboard substrates subject to size limitations. The bonds obtained using the adhesive as described in Example 1 were considerably more durable than typical commercially available atactic polypropylene or pressure sensitive hot melts.

c) A common method of closing the bottom of an erected cardboard carton is by applying adhesive to a skillet-end construction. Because of the stiffness of polypropylene, conventional carton erection machines could not consistently erect and maintain the required shape of the polypropylene cartons in the trial. A prototype machine based on a conveyor and specially arranged folding bars demonstrated that a skillet-end could be automatically constructed using the adhesive as described in Example 1 to generate extremely tough, durable bonds.

d) In many areas of packaging, particularly those associated with food packaging, tamper evidence is of extreme importance. Typical tamper evidence devices involve the application of tabs or shrink-wrap to enclose lids or openings on boxes. It has been proved that by careful manipulation of dispense points it is possible to use the adhesive as described in Example 1 to close lids in such a way that access cannot be obtained to the package without destroying the bond thus indicating access had occurred. The automated in-line application of the adhesive to close lids etc. integrated into filling lines removed the requirement for expensive separate post-filling operations. Tamper evident enclosures constructed using the adhesive as described in Example 1 provided sufficient bond strength to resist transport stresses but could be opened quite easily by the application of peel forces to the lid.

EXAMPLE 6

Construction of Packaging Using Twin-walled Polypropylene Substrates

Sectors of the packaging industry use twin-wall extruded polypropylene sheet to construct packaging and boxes. In many cases constructions use mechanical interlocking devices or semi-automatic or manual hot air welding techniques. These methods of construction tend to be expensive as they are labour intensive or slow. It has been shown that the adhesive as described in Example 1 can be used in manual, semi-automatic or fully automated processes to considerably increase the number of units/hour that can be manufactured. In a similar manner to single ply substrates typical folder/gluer machines can be used to automatically construct side seam and crash-lock systems. The bonds generated are extremely tough and durable compared to typical polypropylene based hot melts.

EXAMPLE 7

Lamination Adhesive for Textiles

It has been shown that the adhesive as described in Example 1 can be applied by means of spraying or die-slot coating to textiles to form a heat re-activated laminated adhesive for textiles. The key benefit to our adhesive system is that it dries to a non-tacky coating which means that the textile can be reeled for delivery to customers for further processing. These coatings can be re-activated at 160° C. via heated press or rollers to laminate polypropylene textiles.

EXAMPLE 8

Bonding Polypropylene Components in Respirators

The adhesive as described in Example 1 has been successfully used to provide a gas tight seal between polypropylene components in the construction of respirator units. Polypropylene has a low surface energy that prevents most conventional adhesives and sealants from bonding the surface. In some applications it is vitally important that airway passages are sealed and gas-tight to prevent the migration of toxic components. Long-term testing has shown that the adhesive as described in Example 1 is suitable for bonding polypropylene constructed respirators.

What is claimed is:

1. An adhesive composition comprising:

| | |
|---|---|
| an amorphous polyalphaolefin | 50–90 wt % |
| a tackifier | 10–40 wt % |
| a functionalised polypropylene | trace–20 wt % | optional further ingredients selected from stabilizers, fillers and waxes;
wherein the amorphous polyalphaolefin is an ethene/propene/1-butene copolymer, and the proportions of the polyalphaolefin, tackifier and functionalised polypropylene are selected to total 100%.

2. An adhesive composition as claimed in claim 1 wherein the polyalphaolefin has a melt viscosity at 190° of 2,700–50,000, mPas.

3. An adhesive composition as claimed in claim 2 wherein the polyalphaofin has a melt viscosity at 190° of 3,000–4,000 mPas.

4. An adhesive composition as claimed in claim 1 wherein the polyalphaolefin is atactic polypropylene.

5. An adhesive composition as claimed in claim 1 wherein the tackifier is selected from the group consisting of hydrocarbon resins, rosin esters and other resins of natural origin and hydrogenated resins.

6. An adhesive composition as claimed in claim 1 wherein the tackifier is a hydrocarbon oligomer resin with MW 500–1,500.

7. An adhesive as claimed in claim 6 wherein the tackifier is a hydrocarbon oligomer resin with MW 700.

8. An adhesive as claimed in claim 1 wherein the functionalised polypropylene is functionalized with 2,2'-dimethyl-1,3-isopropenyl benzyl isocyanate or maleic anhydride.

9. A method of forming a polypropylene article comprising the steps of:

applying a quantity of adhesive as claimed in claim 1 to a first surface of a workpiece;

contacting a second surface of the workpiece to the adhesive; and allowing the adhesive to cure to form said article wherein the first and second surfaces are secured together by the adhesive.

10. A method of forming an article as claimed in claim 9 wherein the article is polypropylene packaging.

* * * * *